(12) United States Patent
Crispim et al.

(10) Patent No.: US 10,326,267 B2
(45) Date of Patent: Jun. 18, 2019

(54) METHOD AND APPARATUS FOR PROTECTING A POLARITY SENSITIVE LOAD

(71) Applicant: LITTELFUSE, INC., Chicago, IL (US)

(72) Inventors: Brian D. Crispim, Salem, NH (US); Geoffrey W. Schwartz, Stoughton, MA (US)

(73) Assignee: Littelfuse, Inc., Chicago, IL (US)

( * ) Notice: Subject to any disclaimer, the term of this patent is extended or adjusted under 35 U.S.C. 154(b) by 514 days.

(21) Appl. No.: 15/070,618

(22) Filed: Mar. 15, 2016

(65) Prior Publication Data

US 2017/0271862 A1    Sep. 21, 2017

(51) Int. Cl.
*H02H 3/18*    (2006.01)
*H02J 7/00*    (2006.01)

(52) U.S. Cl.
CPC ............ *H02H 3/18* (2013.01); *H02J 7/0034* (2013.01)

(58) Field of Classification Search
CPC ............................ H02H 3/18; Y01T 307/839
USPC ......................................................... 361/82
See application file for complete search history.

(56) References Cited

U.S. PATENT DOCUMENTS

| | | | |
|---|---|---|---|
| 3,313,995 A | 4/1967 | Bach et al. | |
| 4,626,764 A * | 12/1986 | Weinhardt | H02J 7/35 |
| | | | 136/293 |
| 6,078,160 A * | 6/2000 | Cilluffo | H01H 47/10 |
| | | | 318/641 |
| 7,616,421 B2 * | 11/2009 | Hickam | H02H 3/14 |
| | | | 320/134 |
| 9,142,951 B2 * | 9/2015 | Pavlin | H01L 27/0248 |
| 2002/0024784 A1 * | 2/2002 | Pinto de Oliveira | ............ |
| | | | H02H 11/002 |
| | | | 361/91.6 |
| 2003/0094858 A1 * | 5/2003 | Shiue | H01H 47/18 |
| | | | 307/141 |
| 2007/0230229 A1 * | 10/2007 | Bryan | B60L 11/005 |
| | | | 365/32 |

FOREIGN PATENT DOCUMENTS

EP    2963764 A1    1/2016

OTHER PUBLICATIONS

ISR and Written Opinion dated Jun. 7, 2017 in corresponding PCT/US2017/021782.

* cited by examiner

*Primary Examiner* — Dharti H Patel

(57) ABSTRACT

Provided herein are improved apparatuses and methods for protecting polarity sensitive loads in DC power circuits that include a power source, a relay coupled to the power source, and a polarity sensitive load coupled to the relay. A diode can be coupled between the power source and the relay. When the power source provides a DC voltage of a desired polarity, the diode can block a current from flowing to a coil of the relay. Consequently, the relay can provide a current path to the polarity sensitive load. When the power source provides a DC voltage of an incorrect or reverse polarity, the diode can allow a current to flow to the coil of the relay. In turn, the coil of the relay can be energized, causing the relay to disrupt the current path provided to the load, thereby protecting the polarity sensitive load from the reverse polarity condition.

18 Claims, 7 Drawing Sheets

METHOD AND APPARATUS FOR PROTECTING A POLARITY SENSITIVE LOAD

FIELD OF THE DISCLOSURE

This disclosure relates generally to the field of circuit protection and, more particularly, to reverse polarity protection of power circuit devices.

BACKGROUND OF THE DISCLOSURE

Direct current (DC) power circuits often include polarity sensitive devices or loads. Polarity sensitive loads, in general, are designed to operate properly when provided with a DC voltage and/or current of an expected or desired polarity. When the polarity sensitive load is provided with a DC voltage and/or current of an incorrect or reverse polarity, the polarity sensitive load may be damaged or may operate incorrectly. A polarity sensitive load may be provided with a DC voltage and/or current of an incorrect or reverse polarity when a power source such as, for example, a battery is misconnected to a circuit containing the polarity sensitive load.

Conventional power circuits having polarity sensitive loads often use protection devices and methods that introduce significant voltage drops when the conventional power circuit is operating under normal conditions (i.e., when a power source of the conventional power circuit is providing a DC voltage and/or current having a proper or desired polarity). As a result of the significant voltage drops, considerable amounts of heat can be generated. Consequently, such conventional power circuits often require high power circuit protection devices such as, for example, high power diodes. These high power diodes can increase costs and the heat dissipated by such high power diodes can increase manufacturing and design costs due to the need for thermal management.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Accordingly, there is a need for power circuits providing protection of polarity sensitive loads that are more efficient and less expensive to design and manufacture.

Various embodiments are generally directed to an improved circuit protection device and improved method of providing circuit protection in DC power circuits having polarity sensitive loads. Various embodiments include a circuit protection device and method of use that includes a power source, a relay coupled to the power source, and a polarity sensitive load coupled to the relay. A diode can be coupled between the power source and the relay. When the power source provides a DC voltage of a first polarity (e.g., a desired or expected polarity), the diode can block a current from flowing to a coil of the relay. As a result, the relay can provide a current path to the polarity sensitive load. When the power source provides a DC voltage of a second polarity (e.g., an undesired or incorrect polarity caused by the power source being incorrectly connected), the diode can allow the current to flow to the coil of the relay. In turn, the coil of the relay can be energized, causing the relay to disrupt the current path provided to the load, thereby protecting the polarity sensitive load from the reverse polarity condition.

BRIEF DESCRIPTION OF THE DRAWINGS

By way of example, specific embodiments of the disclosed device will now be described, with reference to the accompanying drawings, in which.

DETAILED DESCRIPTION

The present disclosure will now be described more fully hereinafter with reference to the accompanying drawings, in which preferred embodiments are shown. This disclosure, however, may be embodied in many different forms and should not be construed as limited to the embodiments set forth herein. Rather, these embodiments are provided so that this disclosure will be thorough and complete, and will fully convey the scope of the disclosure to those skilled in the art. In the drawings, like numbers refer to like elements throughout.

Figure 1:
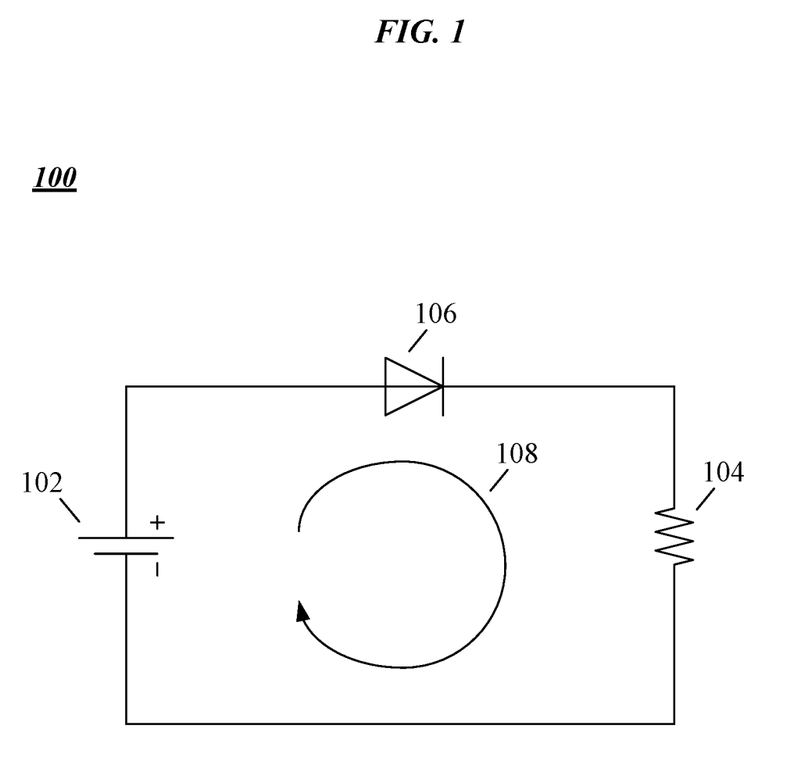
FIG. 1 illustrates a conventional circuit for protecting a polarity sensitive load in a first operating state.

FIG. 1 illustrates a conventional circuit 100 for protecting a polarity sensitive load. The conventional circuit 100 can include a power source 102, a polarity sensitive load 104, and a diode 106. As shown in FIG. 1, the diode 106 can be placed in series with the polarity sensitive load 104. The power source 102 can be a direct current (DC) power source such as, for example, a battery. The polarity sensitive load 104 can represent a load that can be damaged and/or a load that will operate improperly when provided with a DC voltage and/or current of incorrect polarity. As an example, the polarity sensitive load 104 can be provided with a DC voltage and/or current of incorrect polarity when the power source 102 is incorrectly connected to the circuit 100. Under normal operation, the power source 102 is connected to the circuit 100 with an expected or proper polarity (as shown in FIG. 1) where diode 102 is forward biased, thereby allowing a current 108 to flow in the direction indicated.

Figure 2:
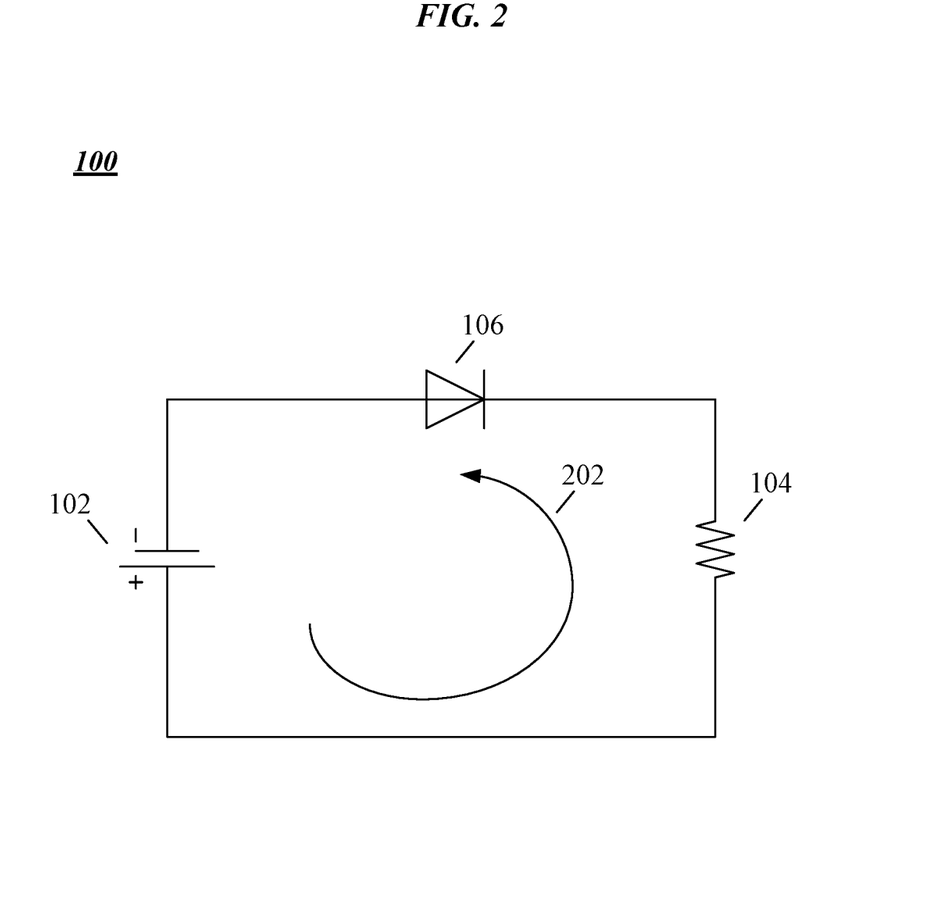
FIG. 2 illustrates the conventional circuit of FIG. 1 in a second operating state.

FIG. 2 illustrates the conventional circuit 100 when the power source 102 is misconnected to the circuit 100. Specifically, positive and negative terminals of the power source 102 are connected to the circuit 100 in a manner that is opposite to the connection of the positive and negative terminals of the power source 102 to the circuit 100 as shown in FIG. 1. As shown in FIG. 1, the positive terminal of the power source 102 is connected to the anode of the diode 106. In contrast, in FIG. 2, the negative terminal of the power source 102 is connected to the anode of the diode 106.

When power source 102 is connected as shown in FIG. 2, the diode 106 is reversed biased and blocks a current flow 202 as shown in FIG. 2, thereby protecting the polarity sensitive load 104. During normal operation when diode 106 is forward biased, diode 106 introduces a voltage drop in circuit 100. For low voltage and/or low current circuit arrangements or applications, the voltage drop introduced by the diode 106 may be relatively low and therefore generally acceptable. For example, at a relatively low current of 1A, 0.7 w of power is dissipated. In this example, 1 A diodes are readily available and relatively inexpensive. However, for high voltage and/or high current circuits, the voltage drop across the diode 106 as well as the heat generated by the diode 106 can be significant. For example, at higher currents such as 50 A, 50W of power would have to be dissipated and 50 A diodes are relatively expensive. As a result, high power diodes are generally needed for high current applications which can increase costs and increase needed space for a high current diode. For example, at about 6 A, the cost of the diode necessary for the application would exceed the cost of the relay. Further, the significant heat generated must be accounted for which can also introduce additional design and manufacturing costs.

Figure 3:
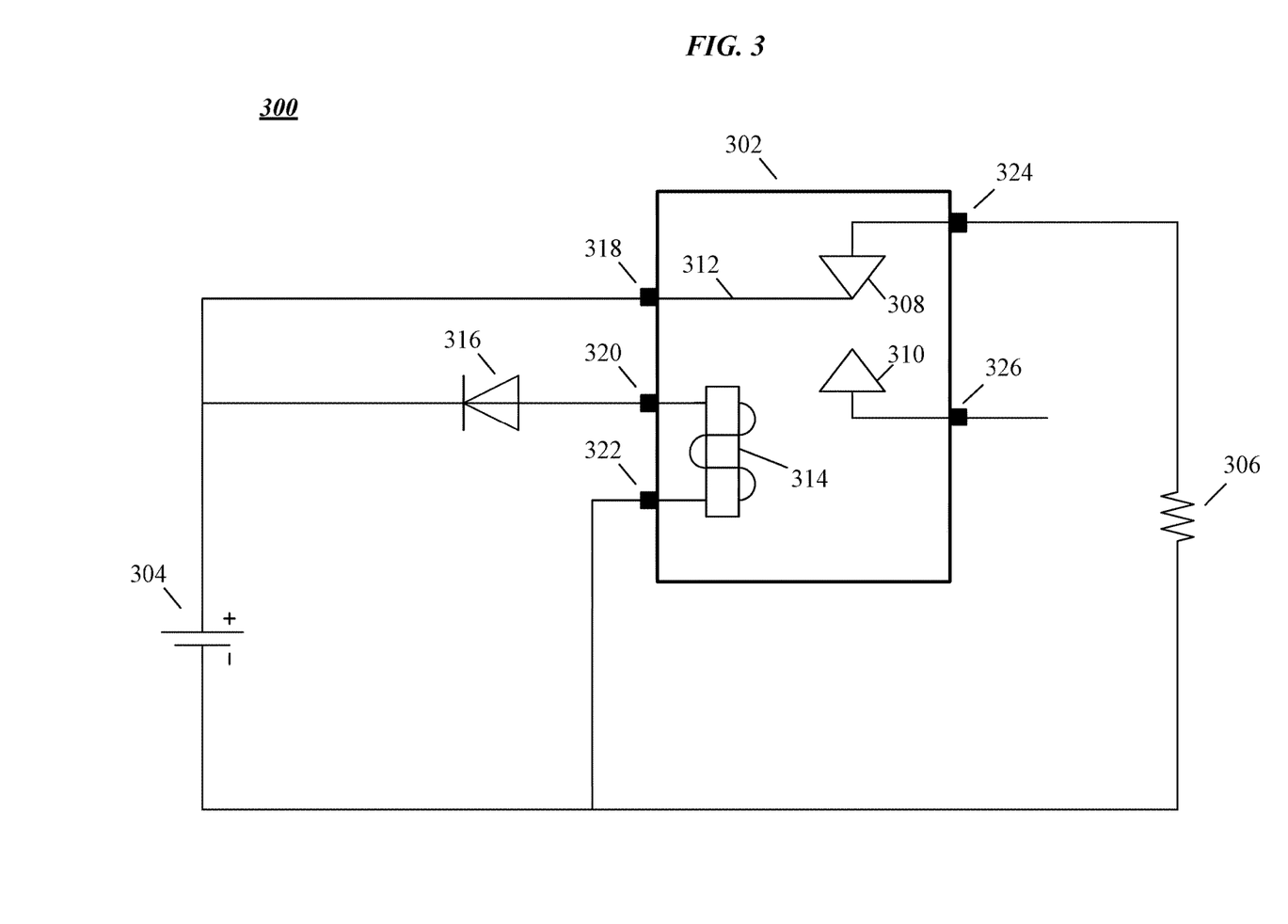
FIG. 3 illustrates a first exemplary circuit for protecting a polarity sensitive load in a first operating state.

FIG. 3 illustrates an exemplary circuit 300 for protecting a polarity sensitive load. The circuit 300 can include a relay 302, a power source 304, a polarity sensitive load 306, and a diode 316. The power source 304 can be a DC power source such as, for example, a battery. The power source 304 can be, for example, a DC voltage source or a DC current source. The power source 304 can include a positive terminal and a negative terminal. Depending on how the power source 304 is connected to the circuit 300, the power source 304 can provide a DC voltage and/or current of a first polarity or of a second polarity. As shown in FIG. 3, the power source 304 is providing a DC voltage and/or current of a first polarity (e.g., the negative terminal can be connected to a ground). As such, FIG. 3 can be considered as showing the circuit 300 in a first operating state.

The relay 302 can include a normally closed contact 308, a normally open contact 310, an armature or connector 312 (e.g., a moveable connector or moveable contact 312), and an electromagnet or coil 314. In an initial state, the connector 312 can be connected to the normally closed contact 308. When sufficient power is provided to the coil 314, the coil 314 can be energized and can cause the connector 312 to disconnect from the normally closed contact 308 and to connect to the normally open contact 310.

The relay 302 can be an industry standard relay such as, for example, a relay conforming to one or more standards set by the International Standards Organization (ISO) or the Society of Automotive Engineers (SAE). As an example, the relay 302 can be a 5-pin single pole, double throw (SPDT) relay. The relay 302 can include pins 318-326 for connecting to the constituent components of the relay 302. The pins 318-326 can be considered to be contact points for connecting to the constituent components of the relay 302. As shown in FIG. 3, pin or contact 318 can be coupled to the connector 312, pin or contact 320 can be coupled to a first component of the coil or electromagnet 314, pin or contact 322 can be coupled to a second component of the coil or electromagnet 314, pin or contact 324 can be coupled to the normally closed contact 308, and the pin or contact 326 can be coupled to the normally open contact 310. As shown, the pin or contact 322 and the second component of the coil or electromagnet 314 can be coupled to a grounded or negative side of the circuit 300.

As an example, the connector 318 can correspond to terminal or pin 30, the connector 320 can correspond to terminal or pin 86, the connector 322 can correspond to terminal or pin 85, the connector 324 can correspond to terminal or pin 87a, and the connector 326 can correspond to terminal or pin 87 of a 5-pin SPDT ISO or SAE standard relay.

As shown in FIG. 3, the circuit 300 can include a diode 316 coupled to the coil 314 and the power source 304. Specifically, the cathode of the diode 316 can be connected or coupled to the power source 304 and the anode of the diode can be connected or coupled to the terminal 320 to provide electrical connectivity to a first component of the coil 314. Power source 304 is coupled to the connector 312 via the terminal 318 and coupled to the diode 316. The terminal 322 can be connected to a ground side of the circuit 300. The normally closed contact 308 can be coupled to the load 306 via the terminal 324. The normally open contact 310 can be connected to the terminal 326 and can remain an open connection (e.g., not connected to any other electrical device). The connector 312 is connected or coupled to the normally closed contact 308. In such a state, the relay 302 (and the circuit 300) can be considered to be operating under a normal condition or within a first possible state of operation. In particular, when operating under normal conditions, the coil 314 is not energized and the connector 312 remains connected to the normally closed contact 308.

The circuit 300 can operate under a normal condition when the power source 304 is properly connected to the circuit 300 (having the polarity as shown in FIG. 3). Specifically, the positive terminal of the power source 304 is connected to the cathode of the diode 316. Under such a scenario, the diode 316 is reversed biased and blocks current from flowing to the coil 314. As a result, the coil 314 remains relaxed or inactivated such that the connector 312 remains connected to the normally closed contact 308. Current in the circuit 300 can consequently flow from the power source 304, to the connector 318, to the relay connector 312, to the normally closed contact 308, to the connector 324, and to the load 306. Circuit 300 can be considered to provide high side switching in that the relay 302 is connected between the voltage source 304 and the load 306. The circuit 300, by maintaining the diode 316 in a reverse biased mode during normal operation, prevents the diode 316 from introducing a voltage drop and therefore associated heat.

According to various embodiments, the diode 316 of circuit 300 can alternatively be coupled to the low side of the coil 314. That is, the diode 316 can be coupled between a second component of the coil 314 (e.g., coupled or connected to the pin or connector 322) and a ground or low side of the circuit 300. Specifically, the cathode of the diode 316 can be coupled to the pin or connector 322 and the anode of the diode 316 can be coupled to a ground or low side of the circuit 300. The first component of the coil 314 (e.g., by way of the pin or connector 320) can be connected to the power source 304 (e.g., directly connected). With this arrangement, the diode 316 will remain reverse biased when the power source 304 is correctly connected to the circuit 300 (e.g., when a positive terminal of the power source 304 is coupled to the pin or connector 320). The diode 316 can become forward biased when the power source is misconnected to the circuit 300 (e.g., when a negative terminal of the power source 304 is coupled to the pin or connector 320). Accordingly, this alternative positioning of the diode 316 can also provide a circuit arrangement that protects the polarity sensitive load 306 as described above in relation to FIGS. 3 and 4.

Figure 4:
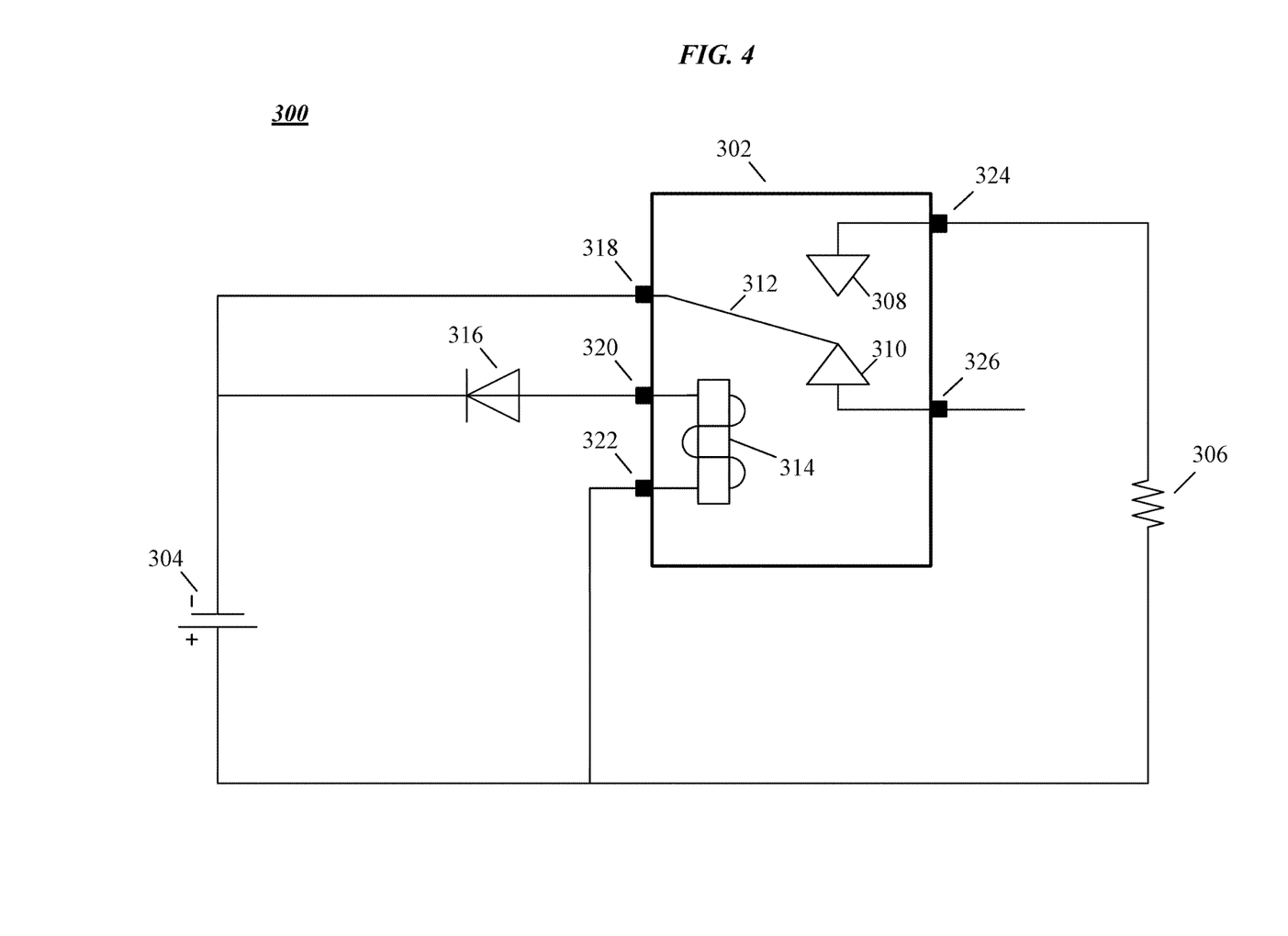
FIG. 4 illustrates the first exemplary circuit of FIG. 3 in a second operating state.

FIG. 4 illustrates circuit 300 in a second state or a protection state. Specifically, FIG. 4 illustrates the circuit 300 as it provides protection to the load 306 from an incorrectly connected power source 304. Compared to FIG.

3, the power source 304 as shown in FIG. 4 is misconnected such that it provides a DC voltage and/or current of a second polarity. Specifically, the negative terminal of the power source 304 is connected to the cathode of the diode 316.

When the power source 304 is connected with the polarity as shown, the diode 316 becomes forward biased. When the diode 316 becomes forward biased, current can flow through the coil 314 (for example, from the power source 304, to the terminal 322, to the coil 314, to the terminal 320 and to the diode 316). Current flowing to the coil 314 can energize the relay 302 and can cause the connector 312 to move from the normally closed contact 308 to the normally open contact 310. When the connector 312 moves and is connected to the normally open contact 310, the current path to the load 306 is disrupted such that no current flows to the load 306. As a result, the load 306 is protected from receiving an improper current and/or voltage of undesired (e.g., reverse) polarity.

The circuit 300 as shown in FIGS. 3 and 4 provides protection to the polarity sensitive load 306 without introducing a voltage drop with the diode 316 or introducing heat during normal operation (e.g., when the power source 304 is properly connected to the circuit). In comparison to conventional protection circuits, the circuit 300 forward biases the diode 316 when the power source 304 is misconnected, thereby preventing voltage loss and undesirable heat during normal operation and avoiding the need for high power diodes. In turn, lower cost diodes can be used in the circuit 300 and burdensome design concerns related to large heat dissipation can be avoided.

Figure 5:
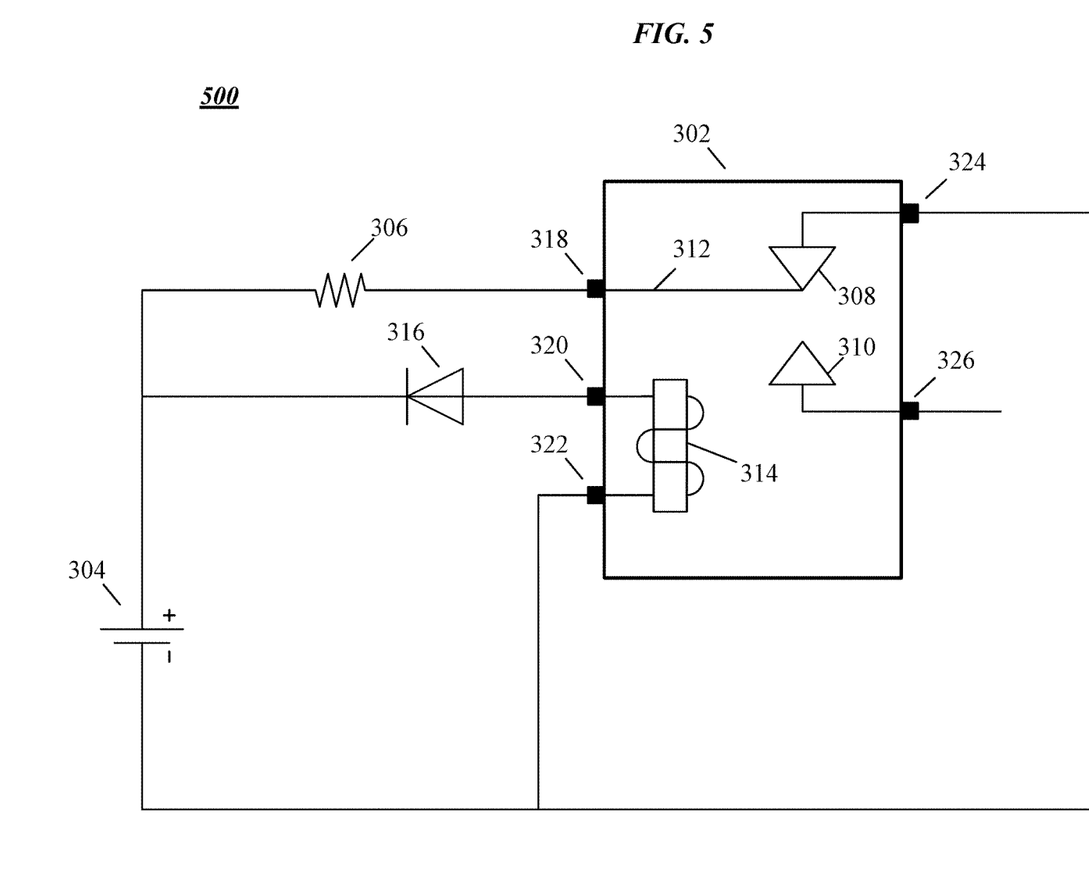
FIG. 5 illustrates a second exemplary circuit for protecting a polarity sensitive load in a first operating state.

FIG. 5 illustrates a second exemplary circuit 500 for protecting a polarity sensitive load. The circuit 500 can provide low side switching protection for the load 306. Specifically, the relay 302 is connected between the load 306 and a ground side of the circuit. Similar to the protection circuit 300, the protection circuit 500 protects the load 306 from a misconnected power source 304 without forward biasing the diode 316 during normal operation.

Load 306 is coupled or connected to the power supply 304 and coupled or connected to the connector 312. The normally closed contact 308 is coupled or connected to a ground side of the circuit 500 through the connector 324. During normal operation, when the power source 304 is properly connected to the circuit 500 (with the polarity as shown in FIG. 5 to provide a first polarity), current flows from the power source 304, to the load 306, to the terminal 318, to the connector 312, and to the normally closed contact 308. Further, during normal operation, the diode 316 is reverse biased, such that the coil 314 remains relaxed (inactivated). Accordingly, FIG. 5 illustrates the circuit 500 in a first operating state or an initial state having a positive terminal of the power source 304 connected to the load 306 and the cathode of the diode 316.

Figure 6:
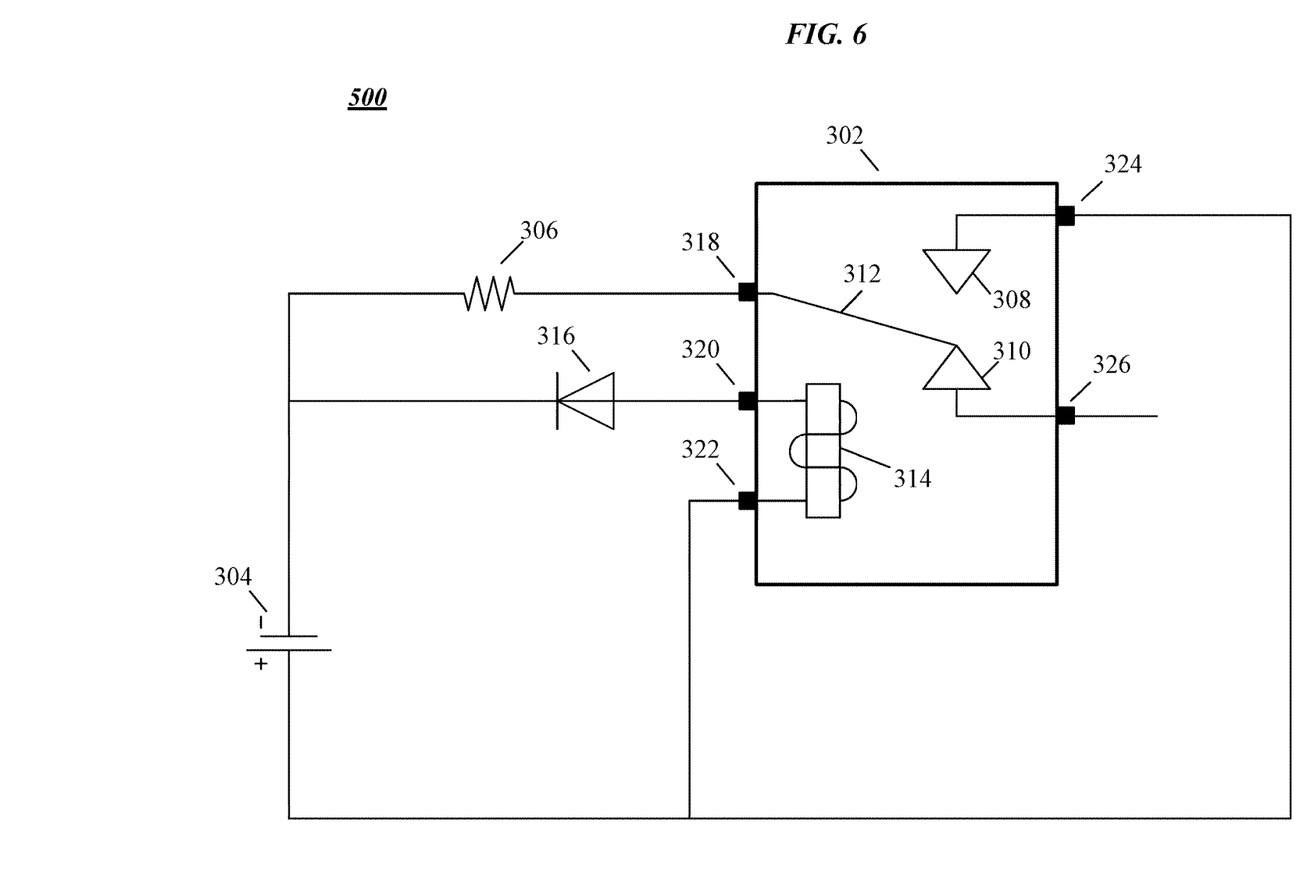
FIG. 6 illustrates the second exemplary circuit of FIG. 5 in a second operating state.

FIG. 6 illustrates protection circuit 500 in a second state or protection state. Specifically, FIG. 6 illustrates the circuit 500 as it provides protection to the load 306 from an incorrectly connected power source 304. Compared to FIG. 5, power source 304 as shown in FIG. 6 is misconnected. Specifically, the negative terminal of the power source 304 is coupled to the load 306 and to the cathode of the diode 316. When the power source 304 is connected with the polarity as shown, the diode 316 becomes forward biased. When the diode 316 becomes forward biased, current flows through the coil 314 (for example, from the power source 304, to the terminal 322, to the coil 314, to the terminal 320, and to the diode 316). The current flowing to the coil 314 can energize the relay 302 and can cause the connector 312 to move from the normally closed contact 308 to the normally open contact 310. When the connector 312 moves and is connected to the normally open contact 310, the current path to the load 306 is disrupted such that no current flows to the load 306. As a result, the load 306 is protected from receiving an improper current and/or voltage of undesired polarity. Further, as with circuit 300, the circuit 500 can provide polarity protection to the load 306 without the diode 316 introducing a voltage drop or unwanted heat during normal operation.

In various embodiments, as an alternative to the diode 316, one or more other circuit components can be used to block current to the coil 314 during normal operation and to allow current to flow to the coil 314 when the power source 304 is misconnected. Alternative circuit components can comprise components that block current when the power 304 is properly connected. For example, a switch and a polarity detector can be used to block current from flowing to the coil 314 when the power source 304 provides a first polarity and can allow current to flow to the coil when the power source 304 provides a second polarity. Preferably, the alternative circuit components introduce minimal voltage and/or heat during normal operation.

According to various embodiments, the diode 316 of circuit 500 can alternatively be coupled to the low side of the coil 314. That is, the diode 316 can be coupled between a second component of the coil 314 (e.g., coupled or connected to the pin or connector 322) and a ground or low side of the circuit 500. Specifically, the cathode of the diode 316 can be coupled to the pin or connector 322 and the anode of the diode 316 can be coupled to a ground or low side of the circuit 500. The first component of the coil 314 (e.g., by way of the pin or connector 320) can be connected to the power source 304 (e.g., directly connected). With this arrangement, the diode 316 will remain reverse biased when the power source 304 is correctly connected to the circuit 500 (e.g., when a positive terminal of the power source 304 is coupled to the pin or connector 320). The diode 316 can become forward biased when the power source is misconnected to the circuit 500 (e.g., when a negative terminal of the power source 304 is coupled to the pin or connector 320). Accordingly, this alternative positioning of the diode 316 can also provide a circuit arrangement that protects the polarity sensitive load 306 as described above in relation to FIGS. 5 and 6.

Figure 7:
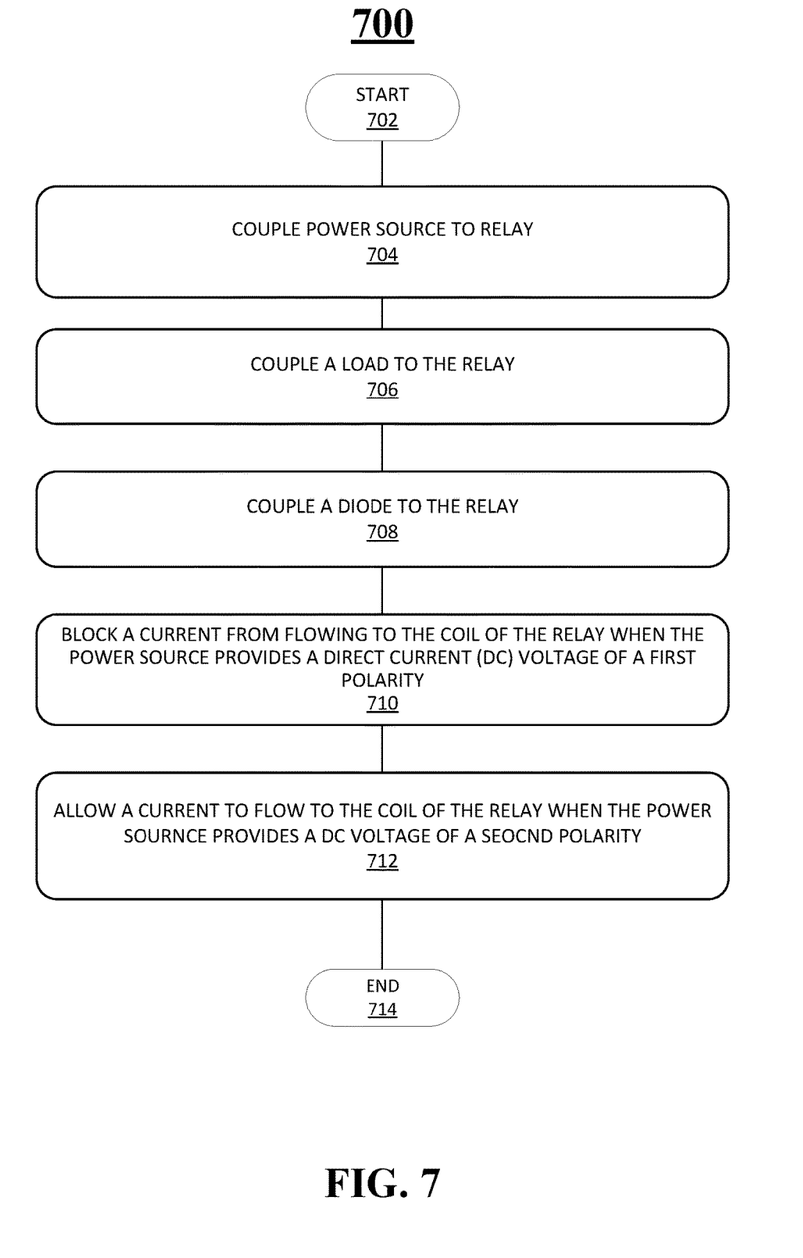
FIG. 7 illustrates a flow diagram for a method for protecting a polarity sensitive load in accordance with the present disclosure.

FIG. 7 illustrates a flow diagram of a method for protecting a polarity sensitive load 700 in accordance with the present disclosure. The method for protecting a polarity sensitive load 700 can be implemented using, for example, the circuits 300 or 500 depicted in FIGS. 3-6. The method for protecting a polarity sensitive load 700 begins at block 702. The method for protecting a polarity sensitive load 700 moves to block 704. At block 704, a power source can be coupled to a relay. The power source can be directly coupled to the relay. For example, the power source can be directly coupled to a connector or armature of the relay.

The power source can be a DC power source such as, for example, a battery providing a first polarity when properly connected relative to the polarity sensitive load and a second polarity when improperly connected relative to the polarity sensitive load. At block 706, a load can be coupled to the relay. The load can be a polarity sensitive load. For example, the load can be damaged and/or can operate improperly when coupled to a power source that provides a reverse polarity. The load can be coupled to a normally closed contact of the relay. Alternatively, the load can be coupled to a connector or armature of the relay. For example, the load can be coupled between the connector of the relay and the power source.

At block 708, a diode can be coupled to the relay. The diode can be coupled between a coil of the relay and the power source. For example, a cathode of the diode can be coupled to the power source and an anode of the diode can be coupled to the coil of the relay. The diode can be coupled to a first component of the coil of the relay. A second component or input of the coil of the relay can be coupled to a ground of the circuit.

At block 710, a current can be blocked from flowing to the coil of the relay when the power source provides a DC voltage of a first polarity. The DC voltage of the first polarity can be a desired or expected polarity. That is, the DC voltage of the first polarity can be a desired or correctly applied polarity applied when the power source is properly connected to the relay relative to the load. When the power source provides the DC voltage of the first polarity, the diode can be reverse biased. When the diode is reverse biased, the diode can block a current from flowing to the coil of the relay. As a result, the coil can remain relaxed. The diode can be reversed biased when a positive terminal of the power source is coupled to the cathode of the diode. Also at block 710, because the coil remains relaxed, a current supplied by the power source can be provided to the load. The current supplied to the load can be provided via the relay. Specifically, the relay can provide a current path to the load by way of a connection between the connector of the relay and the normally closed contact of the relay.

At block 712, a current can be allowed to flow to the coil of the relay when the power source provides a DC voltage of a second polarity. The DC voltage of the second polarity can be an undesired or unwanted polarity (for example, relative to the load). The DC voltage of the second polarity can be provided when the power source is misconnected. As an example, the power source can be considered to be misconnected when a negative terminal of the power source is coupled to the cathode of the diode.

When the power source provides the DC voltage of the second polarity, the diode can be forward biased. When the diode is forward biased, the diode can allow a current to flow to the coil of the relay. As a result, the coil can become energized and can cause the connector of the relay to disconnect form the normally open contact and to connect to the normally open contact of the relay. When the connector of the relay connects to the normally open contact of the relay, a current path provided to the load can be disrupted, thereby preventing a current from flowing to the load. The current path can be disrupted by having, for example, the normally open contact of the relay remain unconnected or as an open connection/circuit path.

The method for protecting a polarity sensitive load 700 may end at block 714. The method for protecting a polarity sensitive load 700 provides protection to a load without a protection device (e.g., a diode) from introducing a voltage drop and/or heat when the power source provides the DC voltage of the first polarity (e.g., under normal operating conditions). Further, the method for protecting a polarity sensitive load 700 can have a protection device (e.g., the diode) become active only when the power source provides the DC voltage of the second polarity (e.g., under conditions where the power source is misconnected).

While the present disclosures references certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A protection circuit, comprising:
a power source;
a relay coupled to the power source;
a load coupled between a moveable connector of the relay and the power source; and
a diode coupled between the power source and the relay, wherein when the power source provides a direct current (DC) voltage of a first polarity, the diode blocks a current from flowing to a coil of the relay so the current is provided from the power source to the load, and then to the moveable connector of the relay from the load, wherein when the power source provides a DC voltage of a second polarity, the diode allows the current to flow to the coil of the relay and the relay blocks the current from flowing to the load.

2. The protection circuit of claim 1, wherein the load is coupled to a normally closed contact of the relay.

3. The protection circuit of claim 2, wherein the moveable connector of the relay is coupled to the power source.

4. The protection circuit of claim 1, wherein the diode is coupled to the coil of the relay.

5. The protection circuit of claim 4, wherein a cathode of the diode is coupled to the power source and an anode of the diode is coupled to the coil of the relay.

6. The protection circuit of claim 5, wherein when the power source provides the DC voltage of the first polarity, the diode is reverse biased.

7. The protection circuit of claim 6, wherein when the power source provides the DC voltage of the first polarity, a moveable connector of the relay is connected to a normally closed contact of the relay.

8. The protection circuit of claim 7, wherein when the power source provides the DC voltage of the first polarity, the current provided to the load flows from the moveable connector to the normally closed contact of the relay.

9. The protection circuit of claim 5, wherein when the power source provides the DC voltage of the second polarity, the diode is forward biased.

10. The protection circuit of claim 9, wherein when the power source provides the DC voltage of the second polarity, the current flows to the coil.

11. The protection circuit of claim 10, wherein when the power source provides the DC voltage of the second polarity, the coil activates to cause a moveable connector of the relay to disconnect from a normally closed contact of the relay and to connect to a normally open contact of the relay.

12. The protection circuit of claim 11, wherein when the power source provides the DC voltage of the second polarity, a current path to the load is disrupted.

13. A method, comprising:
coupling a power source to a relay;
coupling a load between the movable connector of the relay and the power source;
coupling a diode to a coil of the relay;
blocking a current from flowing to the coil of the relay with the diode and allowing the current to flow to the load from the power source, and then flow to the moveable connector of the relay from the load when the power source provides a direct current (DC) voltage of a first polarity; and allowing the current to flow to the coil of the relay and blocking the current from flowing to the load when the power source provides a DC voltage of a second polarity.

14. The method of claim 13, further comprising coupling the load to a normally closed contact of the relay.

15. The method of claim 14, further comprising coupling the moveable connector of the relay to the power source.

16. The method of claim 13, further comprising connecting the moveable connector of the relay to a normally closed contact of the relay to provide a current path from the power source to the load when the power source provides the DC voltage of the first polarity.

17. The method of claim 16, further comprising activating the coil to cause the moveable connector of the relay to disconnect from the normally closed contact of the relay and to connect to a normally open contact of the relay to disrupt the current path from the power source to the load when the power source provides the DC voltage of the second polarity.

18. An apparatus, comprising:
a relay coupled to a power source;
a polarity sensitive load coupled between a movable connector of the relay and the power source; and
a diode coupled between the power source and a coil of the relay, wherein a current path to the load is provided when the power source provides a direct current (DC) voltage of a first polarity, the current path including the polarity sensitive load receiving a current from the power source, a moveable connector of the relay receiving the current from the load and delivering the current to a normally closed contact of the relay, and wherein the relay disrupts the current path to the load when the power source provides a DC voltage of a second polarity, the current path disrupted by the relay causing the moveable connector of the relay to disconnect from the normally closed contact of the relay and to connect to a normally open contact of the relay, and wherein the diode is forward biased when the power source provides a DC voltage of a second polarity.

* * * * *